(12) United States Patent
Kemer

(10) Patent No.: US 6,997,522 B2
(45) Date of Patent: *Feb. 14, 2006

(54) DASH CONTROL VALVE WITH TWO STEP FUNCTION FOR PARK RELEASE

(75) Inventor: John J. Kemer, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/709,407

(22) Filed: May 3, 2004

(65) Prior Publication Data

US 2004/0194832 A1 Oct. 7, 2004

Related U.S. Application Data

(63) Continuation-in-part of application No. 09/852,232, filed on May 8, 2001, now Pat. No. 6,729,696.

(51) Int. Cl.
*B60T 13/00* (2006.01)
(52) U.S. Cl. .............................. 303/7; 91/426; 137/596
(58) Field of Classification Search .................. 91/426; 137/596; 303/7
See application file for complete search history.

(56) References Cited

U.S. PATENT DOCUMENTS

| 4,169,633 A | 10/1979 | Stearns |
| 4,330,157 A | 5/1982 | Sebo |
| 4,673,222 A | 6/1987 | Knight |

(Continued)

FOREIGN PATENT DOCUMENTS

CA 2 214 156 9/1997

OTHER PUBLICATIONS

PP-DC Park Control Valve, Bendix Service Data, Honeywell Commercial Vehicle Systems Co., Jun. 1999, USA.

(Continued)

*Primary Examiner*—Gerald A. Michalsky
(74) *Attorney, Agent, or Firm*—Calfee, Halter & Griswold LLP

(57) ABSTRACT

A valve assembly for an air pressure system includes an inlet valve, a first control valve, and a second control valve. The inlet valve includes an inlet port, an outlet port and a control port. The inlet valve inlet port communicates with the inlet valve outlet port when the inlet valve control port is above a threshold pressure. The first control valve includes an inlet port, an outlet port, an exhaust port, and a control member. The first control valve inlet port communicates with the inlet valve outlet port. The first control valve outlet port communicates with one of the first control valve inlet port and the first control valve exhaust port as a function of a position of the first control valve control member. The second control valve includes an inlet port, an outlet port, an exhaust port, and a control member. The second control valve inlet port communicates with the inlet valve outlet port. The second control valve outlet port communicates with one of the second control valve inlet port and the second control valve exhaust port as a function of a position of the second control valve control member.

20 Claims, 13 Drawing Sheets

U.S. PATENT DOCUMENTS

| | | |
|---|---|---|
| 4,844,553 A | 7/1989 | Bliss |
| 5,163,353 A | 11/1992 | Horstmann et al. |
| 5,273,308 A | 12/1993 | Griffiths |
| 5,458,403 A | 10/1995 | Moody |
| 5,511,860 A | 4/1996 | Wallestad et al. |
| 5,533,795 A | 7/1996 | Brooks |
| 6,729,696 B1 * | 5/2004 | Kemer et al. ............... 303/7 |

OTHER PUBLICATIONS

MV-3 Dash Control Module, Bendix Service Data, Honeywell Commercial Vehicle Systems Co., Jan. 1999, USA.

* cited by examiner

MATCH TO FIG. 3B

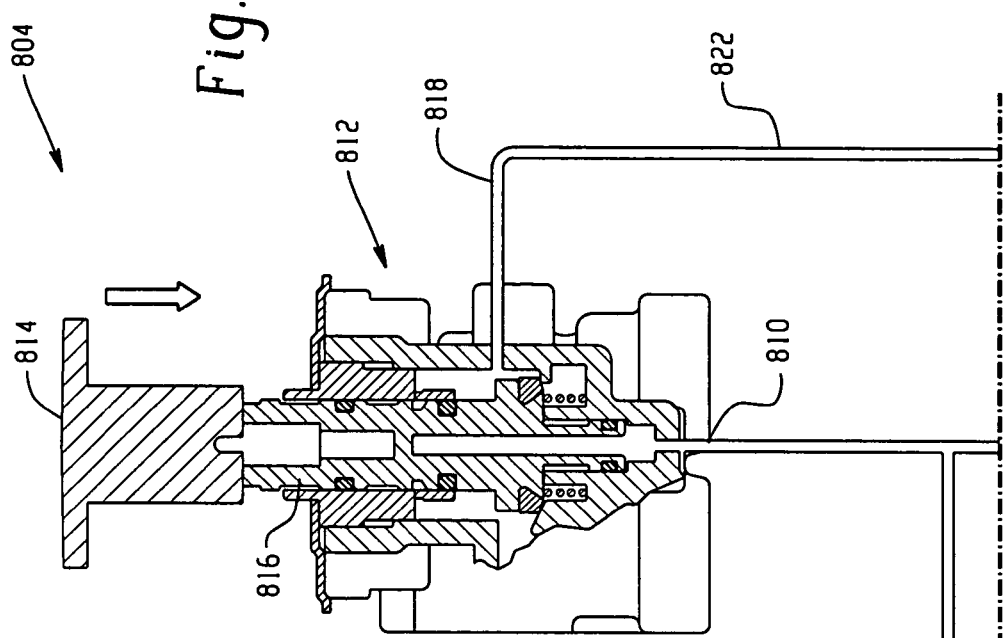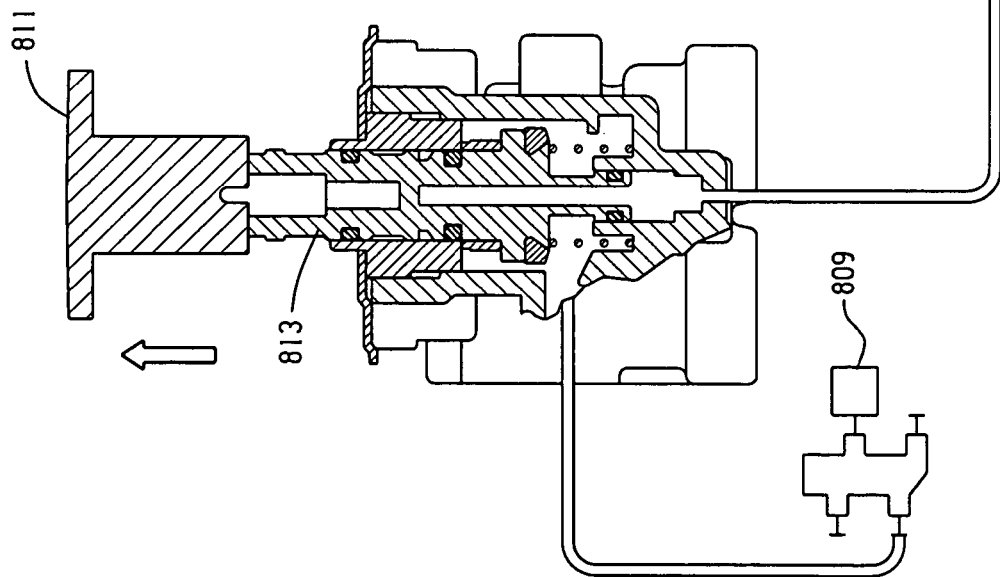

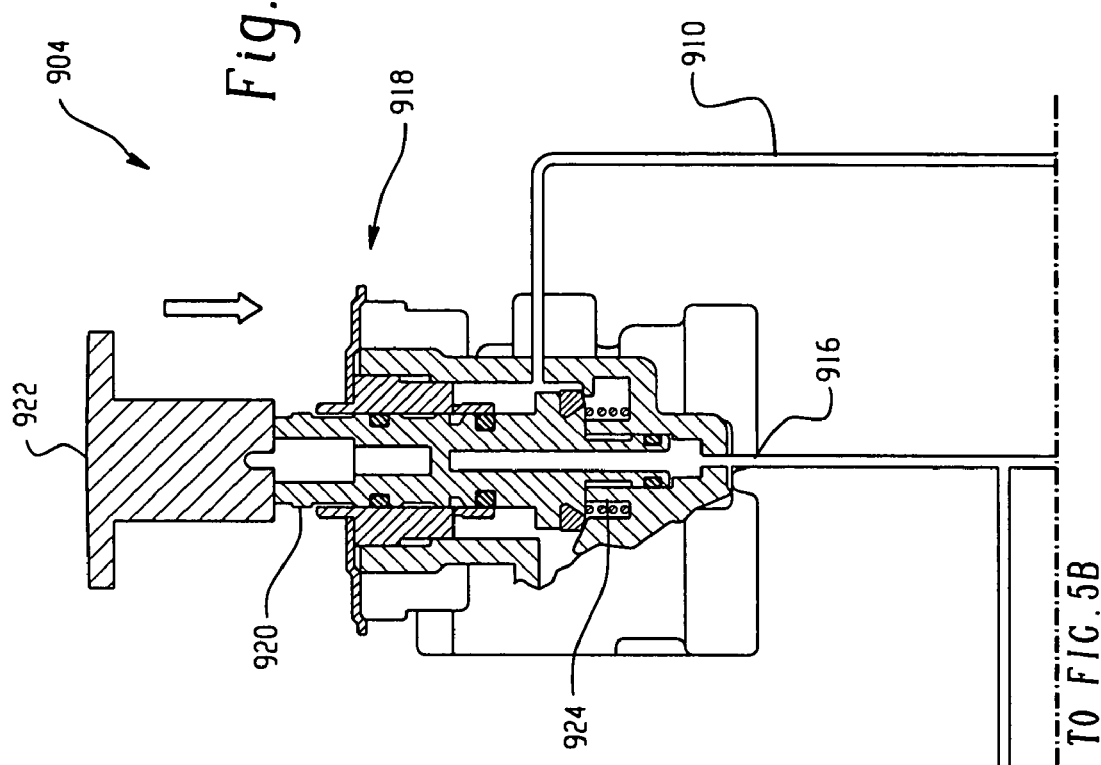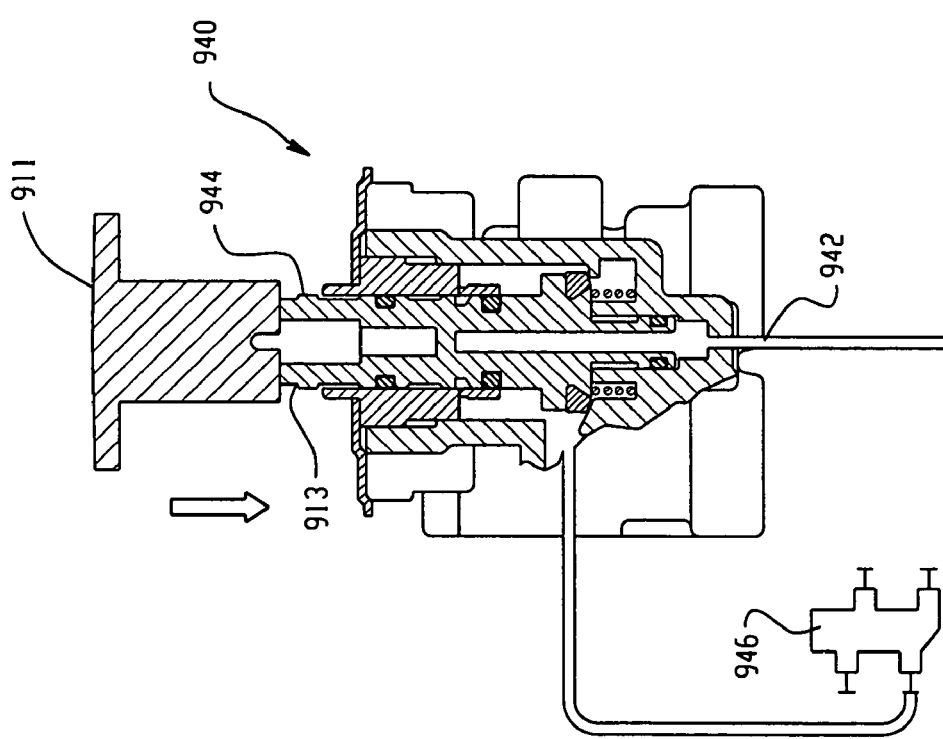

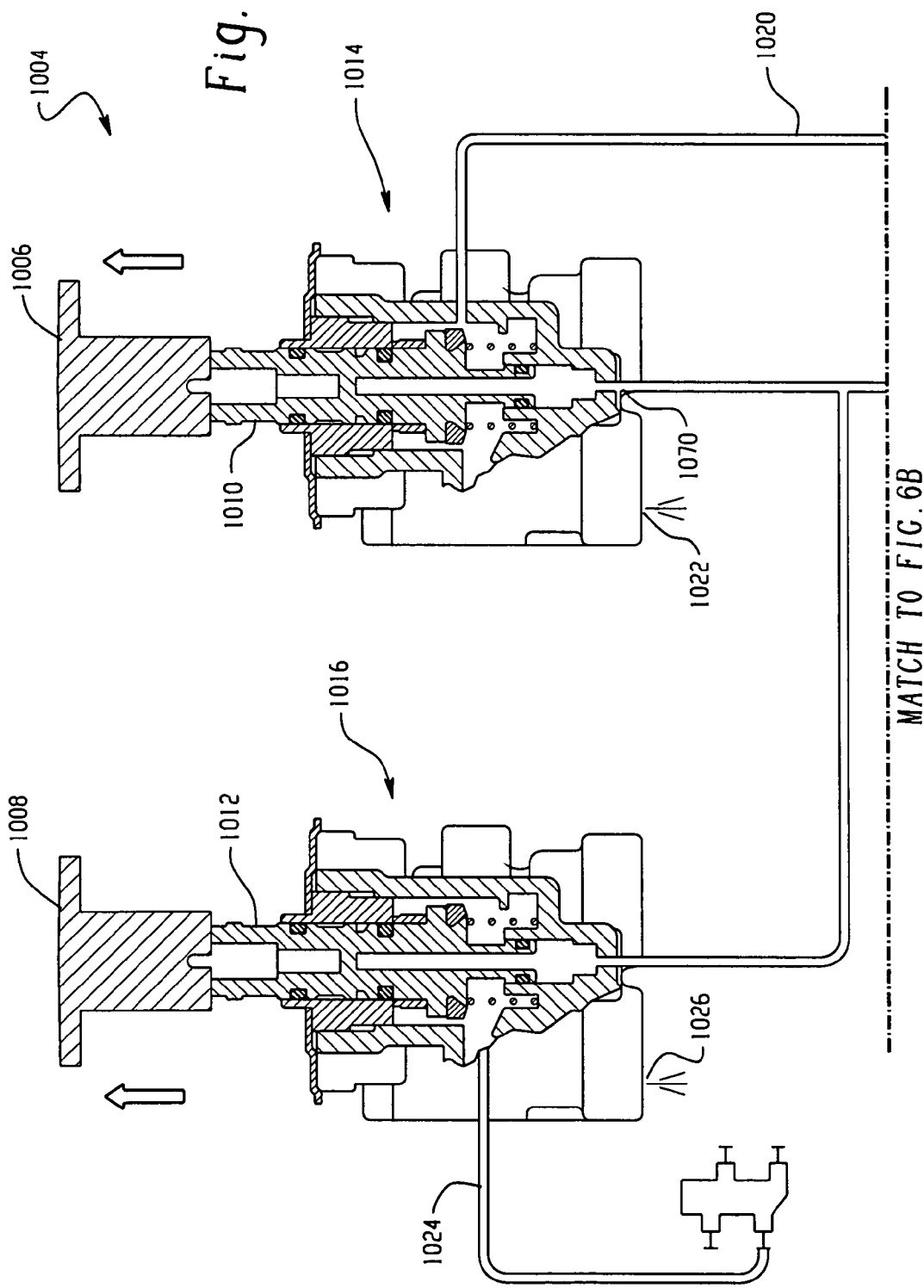

DASH CONTROL VALVE WITH TWO STEP FUNCTION FOR PARK RELEASE

CROSS REFERENCE TO RELATED APPLICATIONS

This application is a continuation-in-part of U.S. application Ser. No. 09/852,232, filed May 8, 2001, now U.S. Pat. No. 6,729,696.

BACKGROUND OF INVENTION

The invention relates to the art of vehicle braking systems and finds particular application in heavy trucks, tractors, and buses. The invention will be described in relation to an air pressure braking system of a tractor-trailer truck system. It will be appreciated, however, that the invention is also amenable to other applications (e.g., other braking systems such as those of other kinds of vehicles and those based on other technologies such as hydraulic or electronic braking systems).

U.S. Pat. No. 4,844,553 to Bliss and U.S. Pat. No. 4,330,157, which are both incorporated herein by reference, disclose control valve arrangements for use in a braking system. The valve arrangements include a pair of valve actuators or plungers that are operated by a vehicle operator. One of the actuators controls communication between an air pressure source and a tractor parking/emergency brake system. The tractor parking/emergency brake system includes spring brakes that are actuated to resist wheel rotation. A force of an included spring or set of springs in the spring brakes urges a braking member against the wheel. During vehicle operation, air pressure is applied against a piston that is associated with the springs. The force applied against the piston counteracts the force of the springs thereby releasing the spring brake and allowing the wheels of the vehicle to rotate. The other actuator controls communication between the pressure source and service brakes of a trailer.

In addition to providing for manual application and release of the parking/emergency brakes, the disclosed valve arrangements also provide for the automatic application of brakes should the source or actuation pressure fall below a threshold. That is to say, the first actuator is forced into a pressure exhaust position by internal springs if the source pressure drops below a first threshold. Similarly the other actuator is forced into a pressure exhaust position if the pressure drops below a second threshold. This provides for the trailer brakes and the tractor brakes to be applied in an appropriate order should a malfunction or leak occur in the braking system.

One feature the prior art valve arrangements do not provide is an assurance that a vehicle operator has actuated the service brakes before the parking brakes are released. As a result, the vehicle could roll unexpectedly when the operator releases the parking brakes.

Therefore, a braking system interlock arrangement that requires the service brakes of a vehicle to be engaged before the parking brakes of the vehicle can be disengaged is desired.

The present invention provides a new and improved apparatus and method which addresses the above-referenced problems.

SUMMARY OF INVENTION

In one embodiment, a valve assembly for an air pressure system includes an inlet valve, a first control valve, and a second control valve. The inlet valve includes an inlet port, an outlet port and a control port. The inlet valve inlet port communicates with the inlet valve outlet port when the inlet valve control port is above a threshold pressure. The first control valve includes an inlet port, an outlet port, an exhaust port, and a control member. The first control valve inlet port communicates with the inlet valve outlet port. The first control valve outlet port communicates with one of the first control valve inlet port and the first control valve exhaust port as a function of a position of the first control valve control member. The second control valve includes an inlet port, an outlet port, an exhaust port, and a control member. The second control valve inlet port communicates with the inlet valve outlet port. The second control valve outlet port communicates with one of the second control valve inlet port and the second control valve exhaust port as a function of a position of the second control valve control member.

BRIEF DESCRIPTION OF DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIGS. 4A and 4B are a diagram showing the valve assembly of FIGS. 2A and 2B in a third operational state.

FIGS. 5A and 5B are a diagram showing the valve assembly of FIGS. 2A and 2B in a fourth operational state.

FIGS. 6A and 6B are a diagram showing the valve assembly of FIGS. 2A and 2B in a fifth operational state.

DETAILED DESCRIPTION

Figure 1:
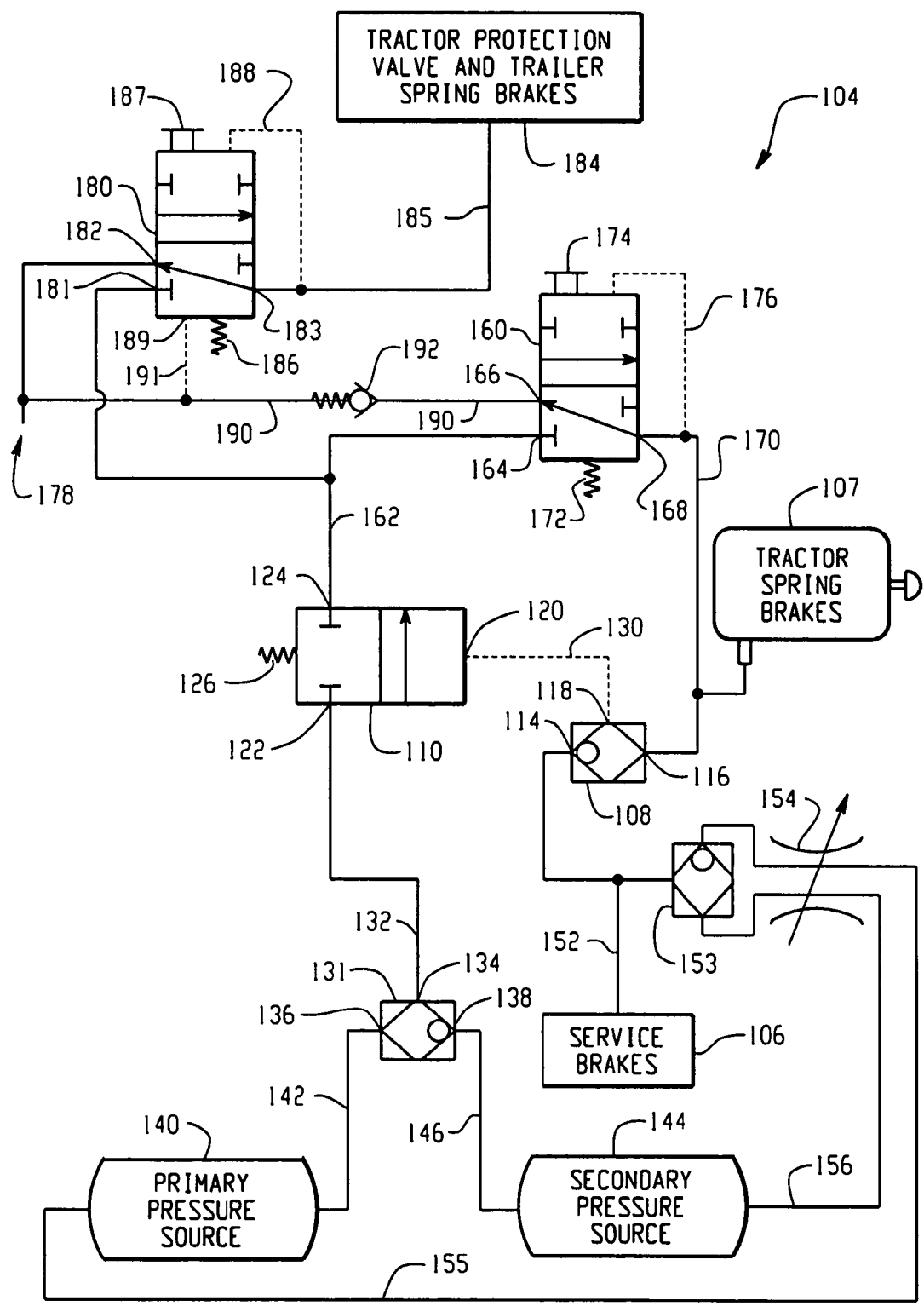
FIG. 1 is a schematic diagram illustrating the control logic of a braking system control block operative to require a two-step brake release process.

Referring to FIG. 1, a valve assembly 104 operative to require an operator of a vehicle to apply service brakes 106 of the vehicle before both i) tractor parking or spring brakes 107 and ii) trailer parking or spring brakes 184 can be released includes a control double check valve 108 and an inlet valve 110. The inlet valve 110 and control double check valve 108 co-operate to form a sensor, system inlet valve, and an interlock device. As will be seen below, the sensor monitors the state of the vehicle braking system. The system inlet valve directs pressure to certain parts of the braking system at appropriate times as determined by the sensor. The interlock latches the sensor and system inlet valve into a permissive or open state when appropriate.

More particularly, the control double check valve 108 includes a service pressure port 114, a locking pressure port 116, and a control pressure outlet 118. The control double check valve 108 operates to direct system status information to the sensor. For example, the information is in the form of system pressures. The control double check valve 108 directs a greater of pressures applied at the service pressure port 114 and the locking pressure port 116 to the control pressure outlet 118.

The inlet valve 110 includes an actuating pressure port 120, an input or supply pressure input port 122, and an output or supply pressure delivery port 124. Additionally the valve includes a biasing member 126 for urging the inlet valve toward a closed position, thereby blocking air flow to the supply pressure delivery port 124 from the supply pressure input port 122. The actuating pressure port 120 communicates with the control pressure outlet 118 of the control double check valve 108 through a control check valve output channel 130. When air pressure delivered to the actuating pressure port 120 exceeds that required to counteract the urging force of the biasing member 126, the inlet valve is actuated to permit flow and pressure equalization between the input port 122 and delivery port 124.

The input port 122 communicates with a supply pressure source through a supply selector double check valve 131 and a supply conduit 132. The supply conduit 132 connects to the check valve 131 at a selected supply delivery port 134. The supply selector double check valve 131 includes a primary supply port 136 connected to a primary supply reservoir 140 via a primary supply line 142 and a secondary supply port 138 connected to a secondary supply reservoir 144 via a secondary supply line 146. The supply selector double check valve 131 directs a higher of pressures from the primary supply port and the secondary supply port to the selected supply delivery port 134.

Typically, the pressurized air is delivered to the supply reservoirs 140, 144 by one or more pumps or compressors (not shown). The pressurized air is used to actuate various components of the vehicle braking system. For example, the pressurized air is used to drive a piston and counteract the force of the springs thereby releasing the brake pads from engagement with respective wheels (not shown) in the tractor and trailer spring brakes 107, 184.

The control double check valve 108 and the inlet valve 110 work together to provide pressurized air for enabling release of the tractor parking brakes 107 and the trailer parking brakes 184 at appropriate times. When it is inappropriate to release the parking brakes the control double check valve 108 and the inlet valve 110 work together to prevent the delivery of pressurized air to the spring brakes 107, 184.

For example, port 114 of the control double check valve 108 communicates with a service brake line 152 to receive pressurized air from a service supply double check valve 153. The check valve 153 directs, for example, a higher of two pressures delivered from a proportional valve 154 to the service brake line. Here, the proportional valve 154 is operatively associated with a brake pedal (not shown) of the vehicle. The proportional valve 154 receives pressurized air from a primary service supply conduit 155 and a secondary service supply conduit 156. The proportional valve 154 proportions the pressures delivered to it. For example, the proportional valve 154 delivers a proportioned primary supply pressure and a proportioned secondary supply pressure to the service supply double check valve 153. The proportioned pressures depend on the degree of actuation of the proportional valve 154. For example, if the brake pedal is not actuated at all, then the delivery pressure of the proportional valve 154 is 0 psi. If the brake pedal is partially depressed then a percentage or fraction of the primary and secondary supply pressures are delivered to service supply double check valve 153. Obviously, various pressures or fractional pressures may be delivered as well. The service supply double check valve 153 then directs one of the supplied pressures to the service brake line 152 to effect braking. When the pressure in the service brake line 152 is higher than a pressure at the locking pressure port 116 the control double check valve operates to deliver the service brake line pressure to the actuating pressure port 120 of the inlet valve 110, thereby indicating that degree to which the service brakes are applied to the wheels of the vehicle. When the pressure at the actuating pressure port 120 exceeds a predetermined threshold, for example 25 psi, the inlet valve 110 directs supply pressure from the supply conduit 132, to the supply delivery port 124 where it enables the tractor and trailer spring brakes 107, 184, respectively, to be released once the respective plungers are deactuated as will become more apparent below.

For example, the supply delivery port 124 is connected to a parking/emergency brake control valve 160 and a trailer parking/emergency brake control valve 180 via a first control valve supply conduit 162.

The spring brake control valve 160 includes a tractor spring brake supply port 164, a tractor spring brake exhaust port 166, and a tractor spring brake delivery port 168. The spring brake delivery port 168 communicates with the tractor spring brake system 107 via a spring brake pressure line 170. Additionally, the spring brake pressure line 170 provides spring brake pressure to the locking pressure port 116 of the control check valve. A biasing spring 172 urges the tractor spring brake control valve toward an exhaust state, wherein any pressure stored in the spring brakes 107 is normally vented via the tractor spring brake exhaust port 166.

It is anticipated that in a comparable electrical braking system, energy will not be stored in the braking system. Therefore, in an electrical analog to the exhaust state, the parking brakes would simply be de-powered. However, some designs, such as, for example capacitive and inductive designs may benefit from energy regeneration or dissipation. Therefore in an electrical analog to the exhaust state, the parking brakes may be connected to an energy storage device or a dummy load.

The trailer air supply valve 180 includes a trailer air supply port 181, a trailer air exhaust port 182, and a trailer air delivery port 183. The delivery port 183 is connected to the trailer air system 184 via a trailer air line 185. A biasing member or spring 186 urges the trailer air supply valve 180 to an exhaust state position where pressure in the trailer air system 184 is vented to atmosphere 178. In order to supply air to the trailer systems 184, the operator must deactuate (e.g., push) a plunger button 187 associated with the trailer air supply valve 180. Deactuating the plunger directs whatever pressurized air that is present at the trailer air supply port 181 to the trailer air delivery port 183. Additionally, pressurized air at the trailer air delivery port 183 is applied to a trailer air supply valve pilot or control port 188. Pressure at the pilot port 188 holds the trailer air supply valve plunger (not shown) and button 187 in position after the operator releases the plunger button 187, thereby holding the trailer air supply valve 180 in the trailer system pressurization state. The trailer air supply valve 180 directs pressurized air for releasing brakes of a trailer. Additionally, trailer air pressure is made available to power trailer accessories such as conveyer belts, ramps and lifts. In one embodiment, pressurized air from the trailer air supply valve is delivered to the trailer system through a tractor protection valve. The tractor protection valve serves to isolate the tractor systems from the trailer in the event of an unintentional disconnection.

As described above, in order to release the tractor parking or spring brakes 107 or the trailer parking or spring brakes 184, the operator must first apply the service brakes. Additionally, the operator must also deactuate plunger buttons or control switches 174, 187 associated with the tractor spring brake control valve 160 and the trailer air supply valve 180, respectively. Deactuating the plunger buttons 174, 187 positions the control valve 160 in a tractor spring brake pressurization state and the trailer air supply valve 180 in a trailer spring brake pressurization state.

While in the tractor spring brake pressurization state, the tractor control valve 160 directs pressurized air at the supply port 164 to the delivery port 168. Additionally, pressurized air at the spring brake delivery port 168 is applied to a tractor spring brake control valve pilot or control port 176. Pressurized air at the pilot port 176 latches or holds the tractor spring brake control valve in position after the operator releases the plunger button 174, thereby latching the tractor spring brake control valve 160 in the spring brake pressurization state. Furthermore, system status information, in the form of spring brake pressure, delivered to the locking pressure port 116 of the control double check valve 108 is directed to the actuation port 120 of the inlet valve 110, thereby locking or latching the inlet valve in a supply pressure delivery state in response to the secondary or spring brakes being in a released state. The control double check valve 108 also operates to isolate the service brake line 152 from the spring brake system.

While in the trailer spring brake pressurization state, the control valve 180 directs pressurized air at the supply port 181 to the delivery port 183. Additionally, pressurized air at the spring brake delivery port 183 is applied to a trailer spring brake control valve pilot or control port 188. Supply pressure at the pilot port 188 latches or holds the trailer spring brake control valve in position after the operator releases the plunger button 187, thereby latching the trailer spring brake control valve 180 in the spring brake pressurization state.

When the operator desires to again park the vehicle and apply the tractor parking/spring brakes 107 and/or the trailer parking/spring brakes 184, the operator actuates the plunger buttons 174, 187 to overcome forces associated with the spring brake pressure applied to the tractor spring brake control valve pilot port 176 and the spring brake pressure applied to the trailer brake control valve pilot port 188. This returns the tractor and trailer spring brake control valves 160, 180 to their exhaust states. Pressures at the tractor and trailer spring brake delivery ports 168, 183 are vented to exhaust ports 166, 182 and the spring brakes engage the wheels of the vehicle tractor and trailer. Additionally, pressure at the locking pressure port 116 is relieved. Therefore, pressure is relieved from the actuating pressure port 120 of the inlet valve 110. The spring 126 then urges the inlet valve into a closed position, thereby preventing the release of the tractor parking brakes 107 and the trailer parking brakes 184 without a prior application of the service brakes 106.

When the tractor and trailer spring brake control valves 160, 180 are placed in an exhaust state in order to vent or relieve pressure in the tractor and trailer spring brakes 107, 184, pressurized air flows from the tractor spring brake exhaust port 166 and the trailer spring brake exhaust port 182 to atmosphere 178. An exhaust conduit 190 carries the exhaust flow from the tractor spring brake exhaust port 166 to atmosphere 178.

Figure 2A:
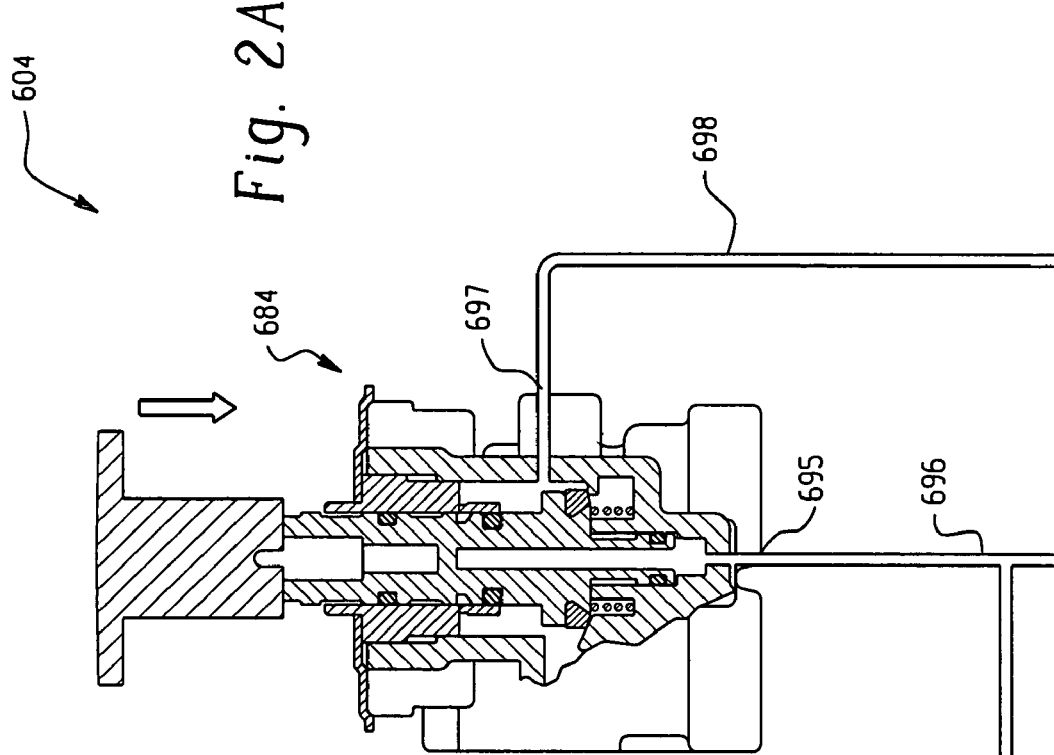
FIGS. 2A and 2B are a diagram showing a first valve assembly configured as a braking system control block operative to require a two-step brake release process, the valve assembly being in a first operational state.
Figure 2A:
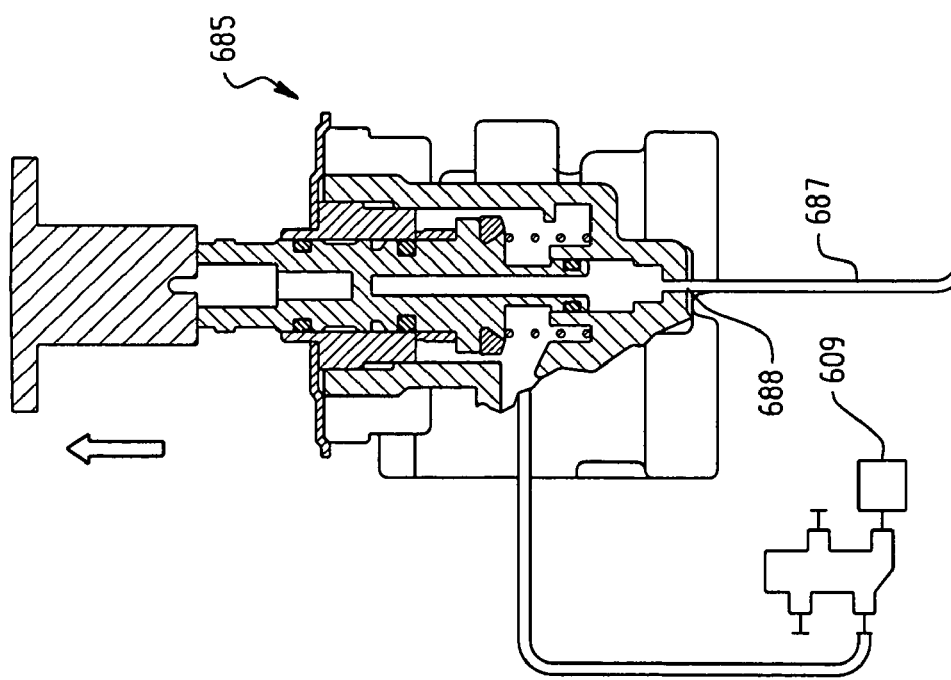
Figure 2B:
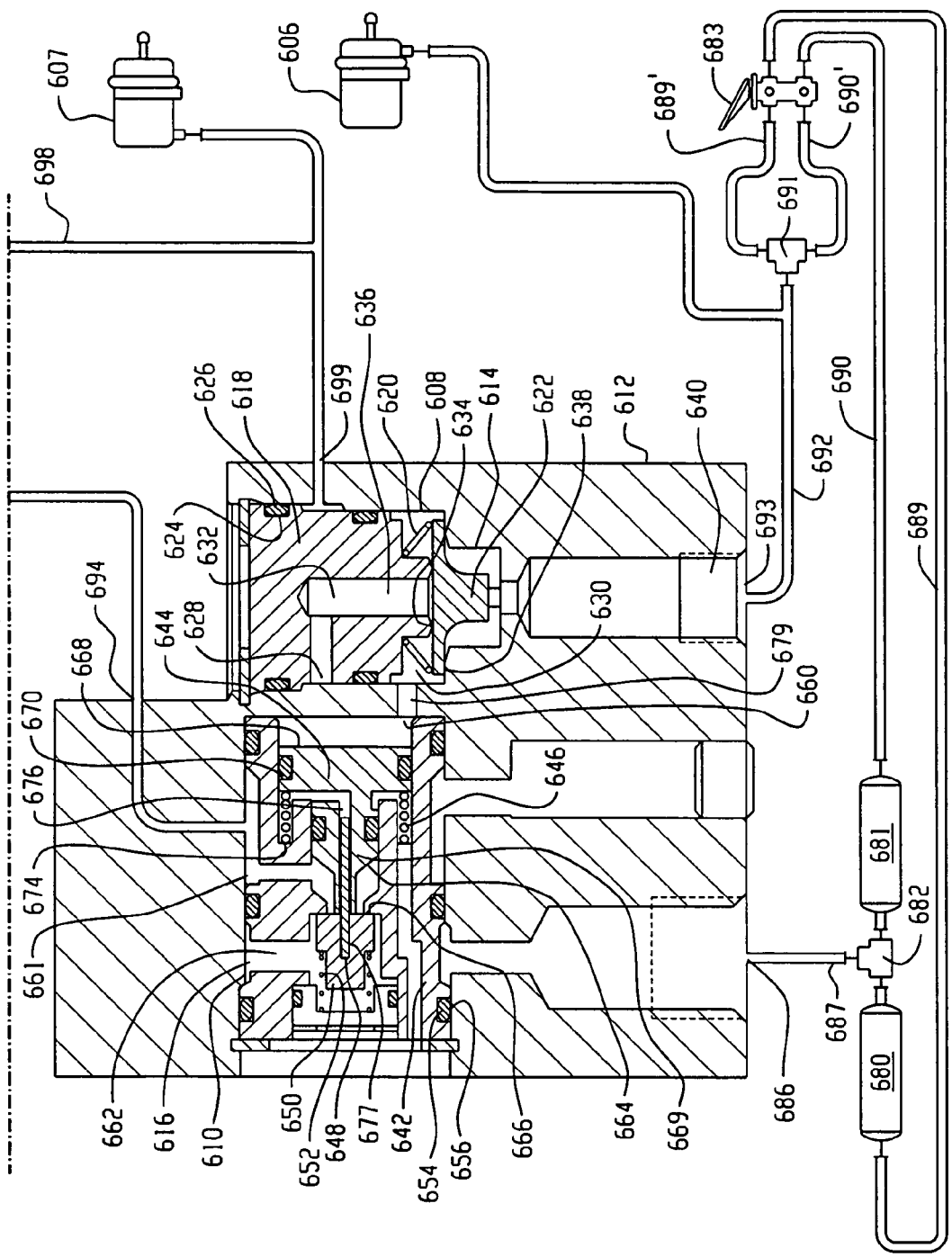

Having described the invention in general terms, details of an exemplary embodiment are now discussed. Referring to FIGS. 2A and 2B, a valve assembly 604 requires an operator of a vehicle to apply service brakes 606 of the vehicle before parking spring brakes 607 of the vehicle tractor and parking spring brakes 609 of the vehicle trailer are released. The valve assembly comprises a control double check valve 608 and an inlet valve 610. The control double check valve 608 and inlet valve 610 reside in a common housing 612. The housing 612 includes a check valve chamber 614 and an inlet valve chamber 616.

The control double check valve 608 includes a spacer 618, a biasing spring 620, and check valve member 622. The spacer includes grooves 624 that carry seals such as o-rings 626. The seals 626 divide the check valve chamber 614 into a first region 628 and a second region 630. The spacer 618 includes a passage 632 that provides communication between the first region 628 and the second region 630. Additionally, the spacer includes a first valve seat 634 operative to receive the check valve member 622. As will be further described in reference to FIGS. 3A and 3B, a second region end 636 of the passage 632 is closed when the first valve seat 634 receives the check valve member 622.

The spring 620 is located between the spacer 618 and the check valve member 622, urging the check valve member 622 toward a second valve seat 638. When seated on the second valve seat 638, the check valve member 622 isolates the second region 630 from a service pressure port 640.

The inlet valve 610 includes a valve frame 642, a piston 644, a piston spring 646, a valve guide 648, an inlet valve member 650, and an inlet valve member return spring 652. The valve frame 642 includes a set of grooves 654 carrying associated seals 656 that divide the inlet valve chamber 616 into a third region 660, fourth region 661, and fifth region 662. The valve frame 642 also includes a piston guide region 664 and an inlet valve seat 666. The inlet valve seat 666 is located at a boundary between the fourth 661 and fifth 662 regions of the inlet valve chamber.

During inlet valve 610 operation, the inlet valve member is occasionally seated on the inlet valve seat 666. During those times, the inlet valve member 650 and the inlet valve seat 666 form a seal separating the fourth 661 and fifth 662 inlet valve regions. When the inlet valve member 650 is not seated on the inlet valve seat 666, there is free communication between the fourth 661 and fifth regions 662. As will be explained in greater detail below, the valve frame 642 also includes various grooves, cutouts and passages that, either alone, or in cooperation with various inlet valve components, form passages or conduits for air flow.

The piston 644 has a piston head 668 and a shaft portion 669. The piston head 668 and the shaft 669 each include grooves carrying seals 670 to maintain isolation between the third and fourth inlet valve regions 660, 661. The shaft 669 is slidably received in the piston guide region 664 of the frame 642. The piston is urged toward the third region 660 by piston spring 646. The piston spring 646 is mounted between an overhang portion of the piston head 668 and a piston spring support 674 portion of the inlet valve frame 642. The piston shaft 669 includes a valve guide bore 676. The valve guide bore 676 is located axially with respect to the piston shaft 669.

The valve guide 648 is, for example, a pin. The valve guide 648 is received within the valve guide bore 676. A portion of the valve guide 648 projects outwardly from the valve guide bore into the fifth region 662 of the inlet valve chamber 616.

In one embodiment, the inlet valve member 650 is made of a resilient material such as rubber. The inlet valve 650 member includes a valve guide bore 677 axially located with respect to the inlet valve member 650. The guide bore 677 receives a tip of the projecting portion of the valve guide 648 to axially locate the inlet valve member 650 within the fifth region 662 of the inlet valve chamber 616.

The second region 630 of the control double check valve 608 communicates with the third region 660 of the inlet valve 610 through a second passage 679. In addition to the control double check valve 608 and the inlet valve 610, the first embodiment 604 further comprises a primary pressurized air source 680, a secondary pressurized air source 681, a source selection valve 682, a service brake actuator or pedal 683, a tractor spring brake control valve 684, and a trailer air supply valve 685.

The primary and secondary pressure sources 680, 681, respectively, are each connected to the source selection valve 682 which directs air from one of the pressure sources to an inlet port 686 of the inlet valve 610 through a supply conduit 687. The primary and secondary pressure sources are also each connected to the service brake actuator 683 through first and second service supply lines 689, 690, respectively.

The service brake actuator 683 delivers proportioned pressure outputs to a second source selection valve 691 through first 689' and second 690' respective service actuator output lines. The pressures delivered in output lines 689', 690' are related to both their respective supplies 680, 681 and the position of the service brake actuator 683. The second source selection valve 691 connects one of the output lines 689', 690' to a service brake line 692 based on the relative pressures of the airs contained within the output lines 689', 690'. For example, the output line containing air at a higher pressure is directed to the service brake line 692.

The service brake line delivers the selected output pressure to the service brakes 606 of the vehicle. Additionally a branch of the service brake line delivers the selected output pressure to a control inlet 693 of the control double check valve 608. When the check valve member is not seated on the second valve seat 638, the control inlet 693 communicates with the second region 630 of the control double check valve 608.

An inlet valve outlet port 694 is connected to a tractor spring brake valve inlet port 695 of the tractor spring brake control valve 684 and a trailer valve inlet 688 of the trailer air supply valve 685 through an inlet valve output conduit 696. The inlet valve outlet port 694 communicates with the fourth region 661 of the inlet valve 610.

A tractor valve delivery port 697 is connected to a spring brake line 698. A branch of the spring brake line 698 is connected to a lockout port 699 of the control double check valve. The lockout port 699 communicates with the first region 628 of the control double check valve 608.

As depicted in FIGS. 2A and 2B, the first embodiment 604 of a valve assembly is in a brake release prevention state. Supply pressure is available in the supply conduit 687. Additionally, plunger buttons of the tractor spring brake control valve 684 and the trailer air supply valve 685 have been deactuated. Therefore, the tractor spring brake control valve 684 and the trailer air supply valve 685 are configured to deliver air to the tractor spring brakes 607 and the trailer spring brakes 609 for causing the spring brakes to release the wheels (not shown). However, the service brake actuator 683 has not been actuated and, therefore, no pressure is applied to the control input 693 of the control double check valve and no pressure is applied to the piston 644 to counteract the force of the spring 646. Therefore, the piston is positioned toward the third region 660 and the inlet valve member 650 is seated on the inlet valve seat 666.

Although supply pressure is available at the inlet valve inlet 686 and therefore in the fifth region, there is no communication between the fifth and fourth regions. Therefore, supply pressure is not available at the inlet valve outlet port 694 and no supply pressure is available at the tractor spring brake valve inlet 695 or the trailer valve inlet 688. Deprived of supply pressure, neither the tractor spring brake control valve 684 nor the trailer spring brake control valve 685 can deliver pressurized air to the spring brake line even though the valve is configured to do so. Therefore, the tractor spring brakes remain engaged and the vehicle is prevented from rolling unexpectedly.

Figure 3A:
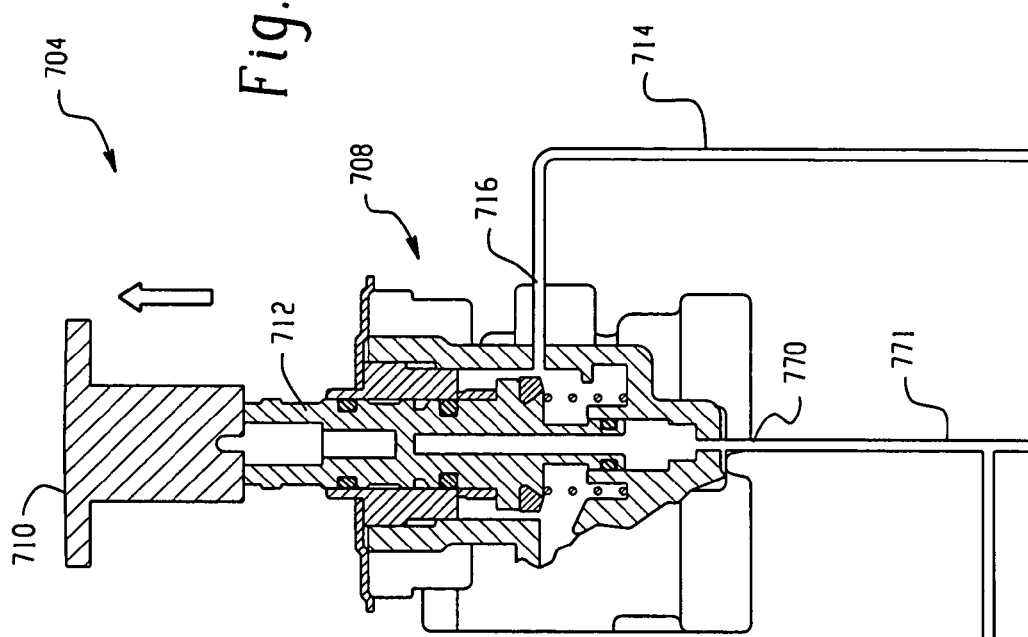
FIGS. 3A and 3B are a diagram showing the valve assembly of FIGS. 2A and 2B in a second operational state.
Figure 3A:
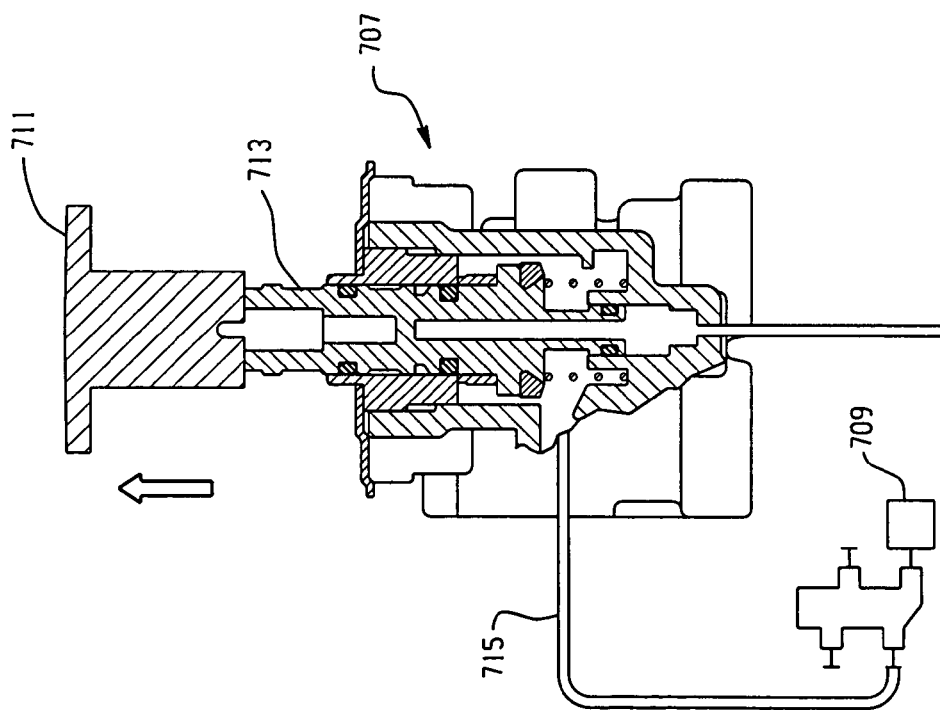
Figure 3B:
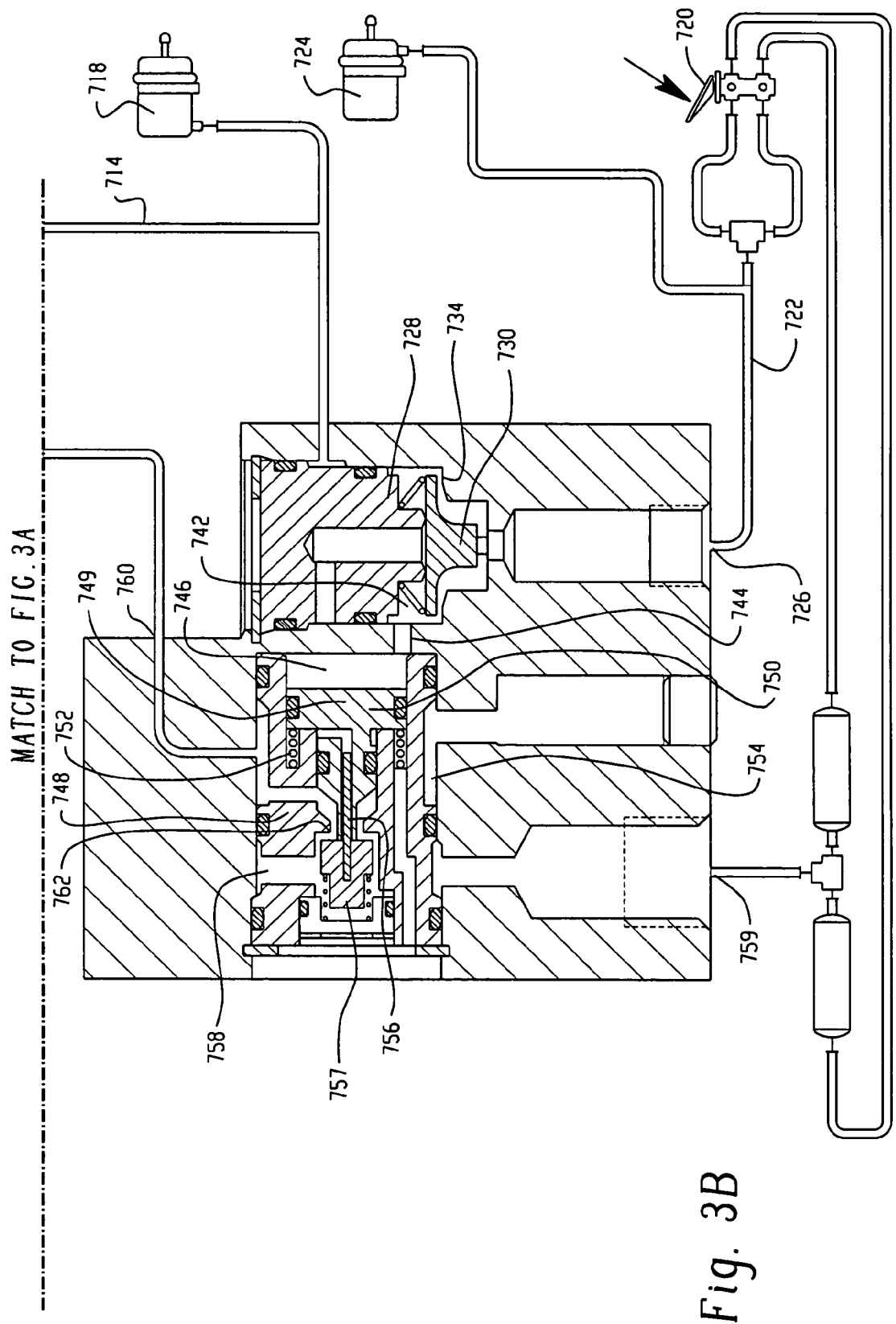

Referring to FIGS. 3A and 3B, the valve assembly 704 illustrates a second operational state of the FIGS. 2A and 2B embodiment. In the second operational state, a tractor spring brake control valve 708 and a trailer spring brake control valve 707 are in respective spring brake exhaust configurations. A tractor valve button 710 and associated plunger 712 is actuated (lifted upwardly as shown), thereby directing pressurized air in spring brake line 714 connected at a spring brake delivery port 716 to an exhaust port (not shown). The tractor spring brakes 718 thus engage the wheels of a vehicle, thereby preventing the vehicle from rolling. Similarly, a trailer valve button 711 and associated plunger 713 is actuated (lifted upwardly as shown), thereby directing pressurized air in spring brake line 715 connected at a spring brake delivery port to an exhaust port (not shown). The trailer spring brakes 709 thus engage the wheels of the vehicle, thereby preventing the vehicle from rolling.

Additionally, in the second operational state, service brake actuator/brake pedal 720 is actuated so that air in service brake line 722 is above a threshold pressure and the service brakes 724 engage the wheels (not shown) of the vehicle. The threshold pressure is selected so that the vehicle will not roll unexpectedly if the tractor spring brakes or the trailer spring brakes 718, 709, respectively, are released. Service pressure is also delivered to an input 726 of a control double check valve 728. With the check valve member 730 unseated from valve seat 734, the pressurized air at the control input 726 communicates with the second check valve region 742 and with a passage 744 between the second check valve region 742 and a third region 746 of an inlet valve 748. A force arising from pressure applied to the piston overcomes a force of a piston spring 752 so that the piston moves toward a fourth region 754 of the inlet valve. Valve guide 756 moves with the piston 750 and an inlet valve member 757 associated with the valve guide. Both the valve guide 756 and inlet valve member 757 are moved further into a fifth region 758 that communicates with an inlet valve supply port 759. The fourth region 754 communicates with an inlet valve outlet port 760. As a result of movement of the inlet valve member from an inlet valve seat 762, a communication path is opened between the fourth and fifth inlet valve regions. Pressurized air delivered to the inlet valve inlet port 759 is communicated to the fourth region 754 by the communication path that was opened when the inlet valve member 757 was lifted off the inlet valve seat 762. As described above, the inlet valve outlet port 760 communicates with the fourth region 754. Therefore, the inlet valve outlet port 760 also receives pressurized air which is made available to a tractor spring brake control valve inlet port 770 and a trailer spring brake control valve inlet port through an inlet valve output conduit 771. If the tractor valve button 710 (and associated plunger 712) or the trailer valve button 711 (and associated plunger 713) were deactuated (e.g., pushed down), the tractor spring brake control valve 708 and the trailer spring brake control valve would deliver pressurized air for releasing the spring brakes 718, 709, respectively.

Figure 4B:
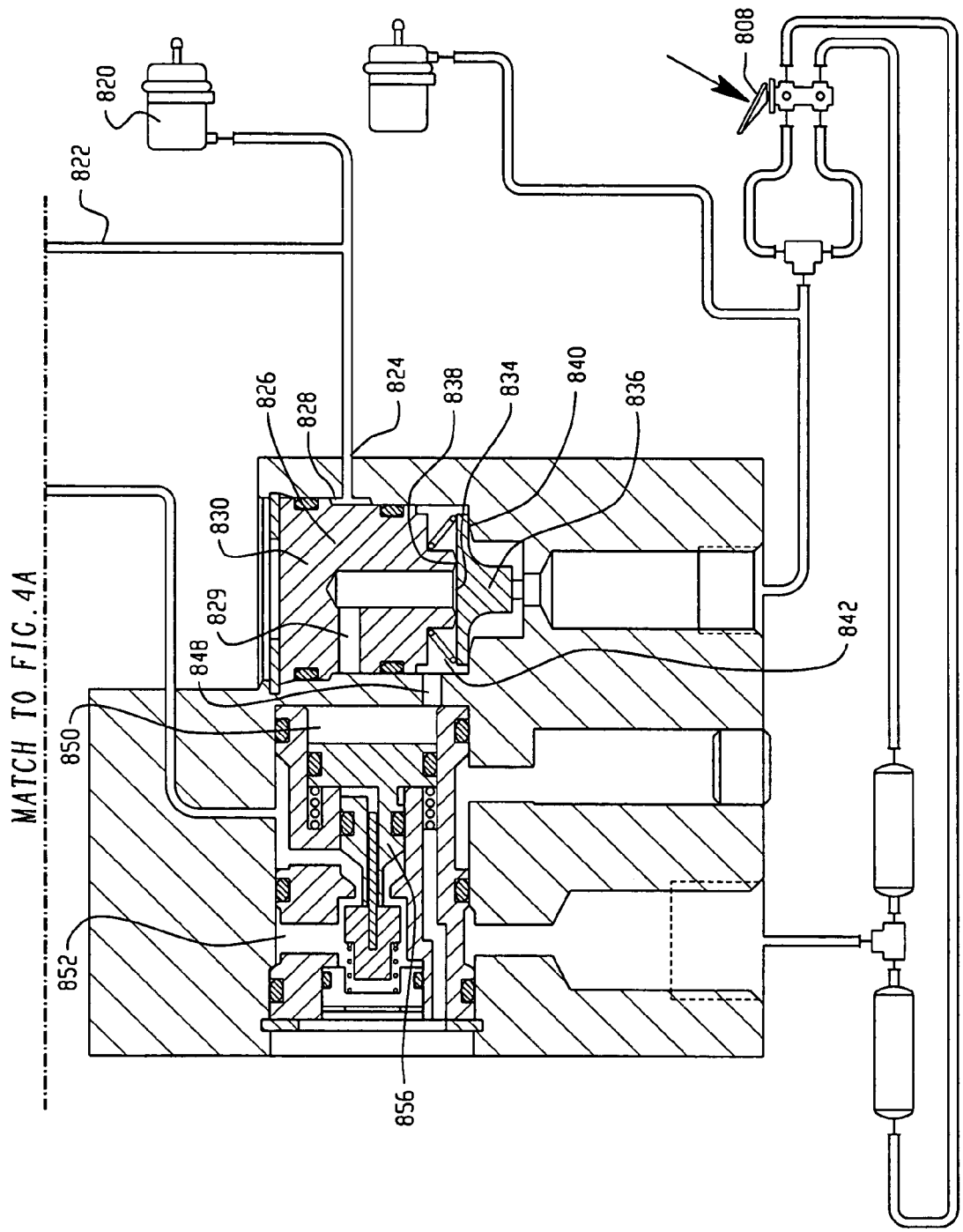

Referring to FIGS. 4A and 4B, the valve assembly (now referenced as numeral 804) is shown in a third operational state. In the third operational state, the service brake pedal 808 has been actuated beyond a threshold degree so that supply pressure is available at a tractor valve inlet port 810 of a tractor spring brake control valve 812. However, in the third state, tractor valve button 814 and a tractor valve plunger 816 are deactuated while trailer valve button 811 and a trailer valve plunger 813 are actuated. As is explained in greater detail in the U.S. Pat. No. 4,844,553 to Bliss, previously incorporated by reference, depressing the valve button 814 and plunger 816 directs pressurized air available at the inlet port 810 to a tractor spring brake control valve delivery port 818 and to tractor spring brakes 820 through a spring brake line 822, thereby releasing the tractor spring brakes. Since the trailer valve button 811 and plunger 813 are actuated, the trailer spring brakes 809 are engaged. A branch of the spring brake line also delivers pressurized air to a lockout port 824 of a control double check valve 826. The lockout port 824 communicates with a first region 828 of the control double check valve 826. A passage 829 in spacer 830 conducts pressurized air in the first region 828 to a second region 834 of the passage 828, urging check valve member 836 away from a first check valve seat 838 and against a second check valve seat 840.

The pressurized air in the passage 829 acting downwardly (relative to the FIGURE) on the check valve member 836 is higher than or equal to a pressure of pressurized air acting upwardly (relative to the FIGURE) on the check valve member 836 and, therefore, the check valve member is pressed against the second seating surface 840 thereby sealing off the control input. The check valve member 836 is moved away from the first seating surface and pressurized air flows through the passage into a third region 842 of the control double check valve and into a second passage 848 that communicates with a fourth region 850 of an inlet valve 852. This provides a force acting on piston 856 of the inlet valve 852 and, in this way, spring brake line pressure 822 delivered to the lockout port 824 latches the inlet valve 852 in an open position independent of the degree of actuation of the service brake actuator 808. This allows the tractor spring brakes to be maintained in their released state after a vehicle operator, for example, removes his foot from a service brake pedal 808.

Figure 5B:
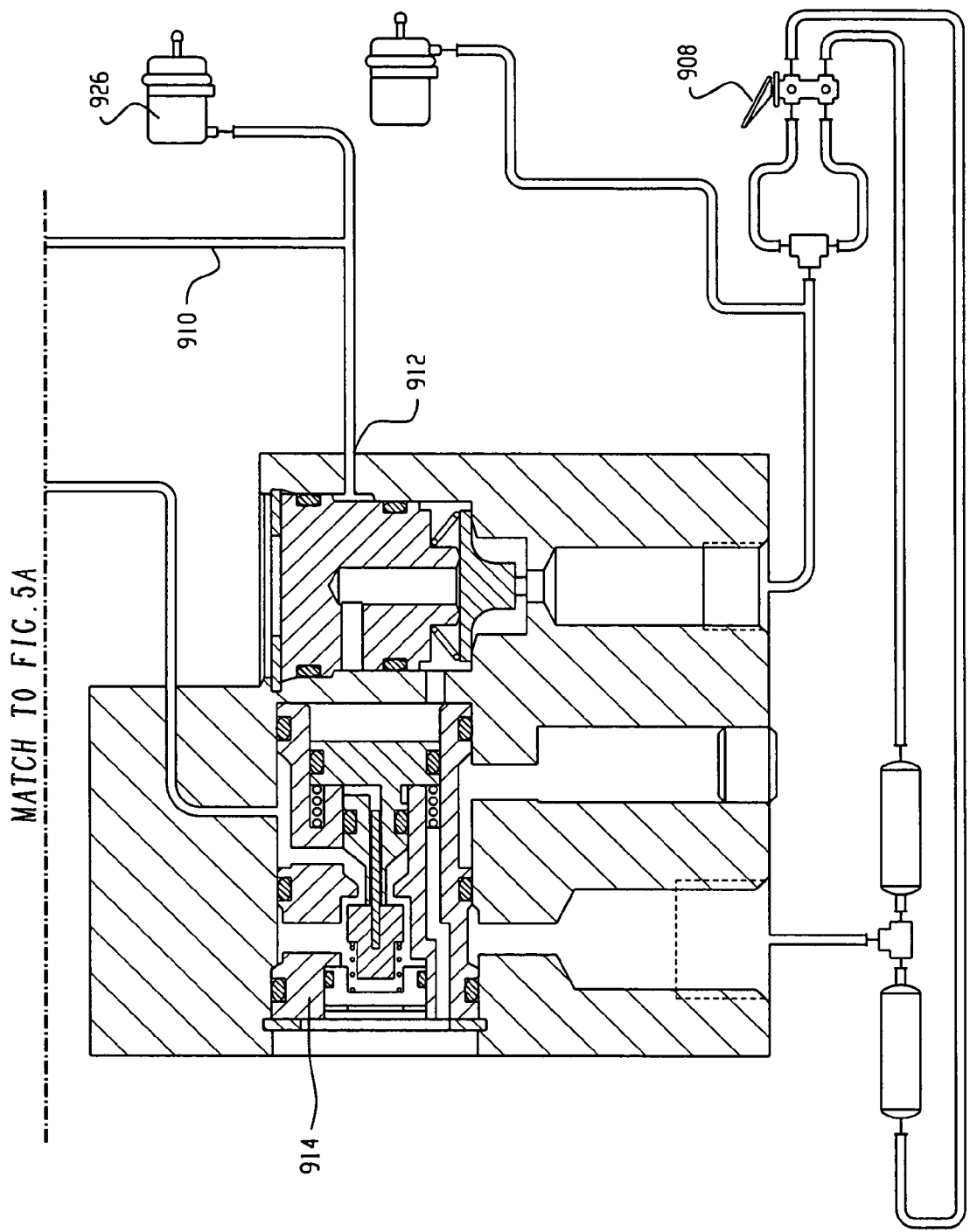

Referring to FIGS. 5A and 5B, the valve assembly 904 is in a fourth operational state. The fourth operational state is similar to the third operational state of FIGS. 4A and 4B; however, the service brake pedal 908 is not actuated. Nevertheless, pressure in spring brake line 910 is delivered to a lockout port 912 and serves to hold an inlet valve 914 in an open position. Therefore supply pressure continues to be delivered to a tractor spring brake control valve inlet 916 of a tractor spring brake control valve 918 and a trailer spring brake control valve inlet 942 of a trailer spring brake control valve 940. A plunger 920 (and button 922) of the tractor spring brake control valve 918 and a plunger 913 (and button 911) of the trailer spring brake control valve 940 are maintained in a deactuated (depressed) position (relative to the FIGURE). For example, internal to the tractor spring brake control valve 918 the pressure of the air applied to the inlet 916 overcomes the force generated by a tractor valve return spring 924 and holds the plunger 920 in the depressed position. Therefore, supply pressure continues to be delivered to the spring brake line 910, spring brakes 926 and the lockout port 912. Additionally, supply pressure at the inlet 916 is also delivered to an inlet 942 of the trailer supply valve inlet 942. The pressure at the inlet 942 holds a plunger 944 of the trailer supply valve 940 in the depressed position. The trailer supply valve 940 delivers supply pressure to trailer systems, including, for example, trailer spring brakes (not shown). In one embodiment, a tractor protection valve 946 is included between the trailer supply valve 940 and the trailer. With pressure supplied to the trailer, parking brakes of the trailer are released and the combination vehicle (tractor and trailer) can be driven to its destination.

Figure 6B:
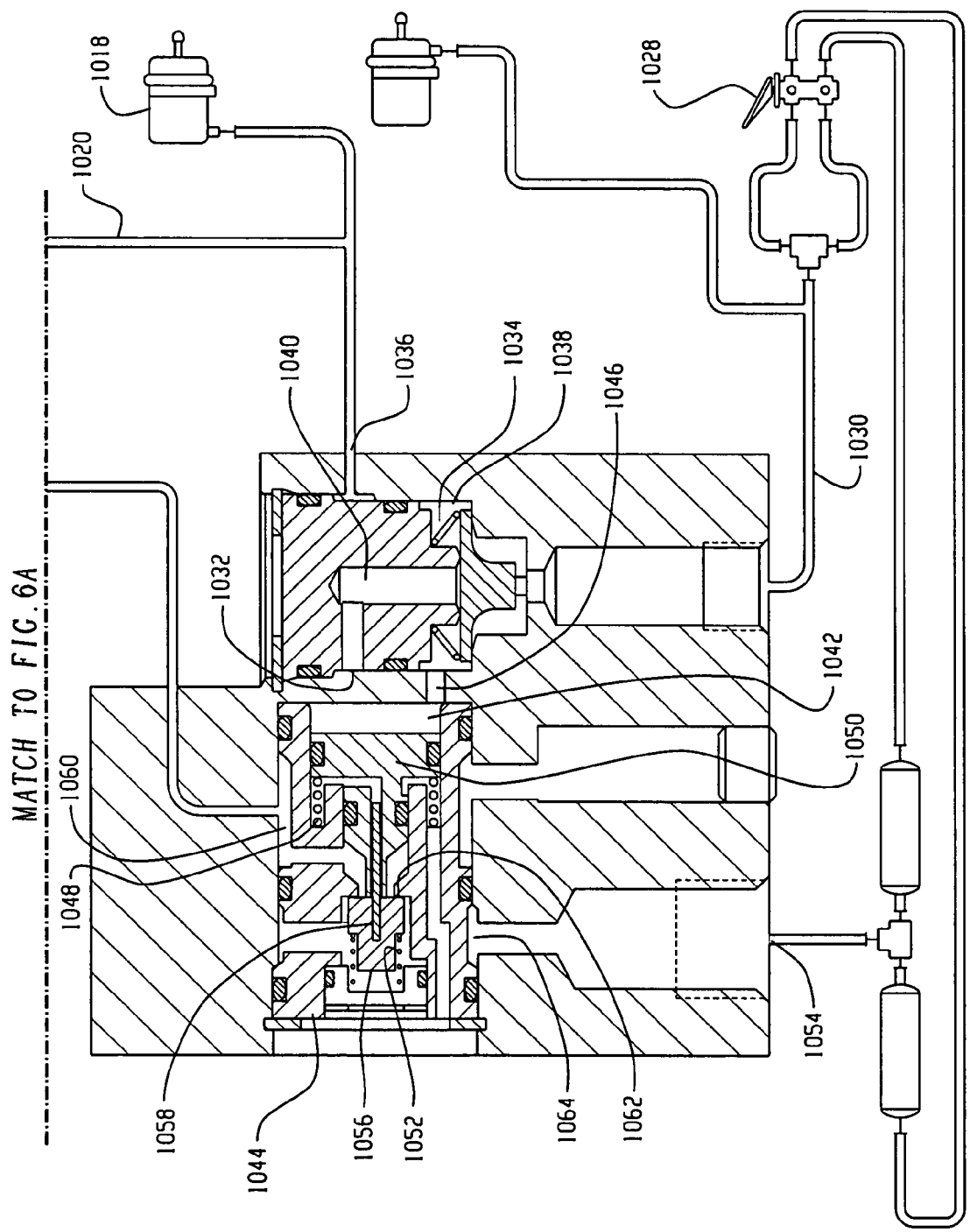

Referring to FIGS. 6A and 6B, the valve assembly is shown in a fifth operational state which is actually a transition from the fourth operational state to the first operational state. In the fifth operational state plunger buttons 1006, 1008 and plungers 1010, 1012 of the tractor spring brake control valve 1014 and a trailer supply valve 1016 have been actuated (i.e., lifted). Therefore the valves 1014, 1016 are in an exhaust position where pressurized air from spring brakes 1018 and spring brake line 1020 is vented through a tractor spring brake control valve exhaust port 1022. Likewise, pressurized air from a trailer system (not shown) and trailer supply line 1024 is vented through a trailer supply valve exhaust port 1026.

Additionally, in the fifth operational state, a service brake actuator 1028 is not actuated so that air pressure in service brake line 1030 is zero. For example, the pressure of air in the service brake line is below a threshold thereby indicating that the service brakes are not engaged sufficiently to prevent the vehicle from rolling unexpectedly. As the spring brakes 1018 and spring brake line 1020 are vented, pressurized air in a first region 1032 of a control double check valve 1034 flows from a lockout port 1036 of the control double check valve 1034 and into the spring brake line 1020 to be vented to atmosphere. As air leaves the first region 1032, air in a second region 1038 of the control double check valve 1034 flows through a first passage 1040 into the first region 1032 and out the lockout port 1036. Therefore, a pressure in the second region 1038 is reduced. Similarly, air in a third region 1042 of an inlet valve assembly 1044 flows through a second passage 1046 into the second region 1038 and eventually out the lockout port 1036. As pressurized air leaves the third region 1042, a piston spring or resilient member 1048 is able to urge a piston 1050 of the inlet valve assembly 1044 toward the third region 1042. As the piston 1050 moves toward the third region 1042, forces from an inlet valve member return spring 1052 and/or pressurized air supplied from an inlet port 1054 of the inlet valve assembly 1044 urge an inlet valve member 1056 and an associated valve 1058 guide toward and further into a fourth region 1060 of the inlet valve assembly 1044, respectively. Ultimately, the inlet valve member 1056 is seated on an inlet valve seat 1062 thereby preventing communication between the fifth region 1064 and the fourth region 1060. Therefore, no significant amount of pressurized air is available to the tractor spring brake valve inlet port 1070 or the trailer spring brake valve inlet port. When substantially all the pressurized air has been vented or returned to a low pressure tank or reservoir, the transition is complete and the fifth valve assembly 1004 is in the first operational state.

Figure 7:
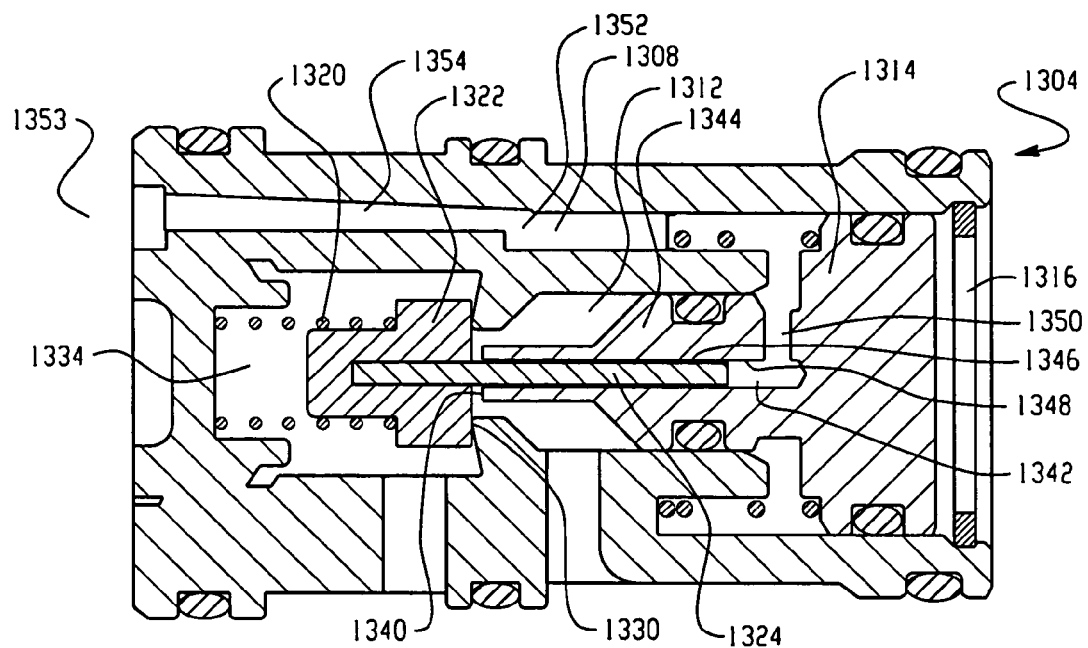
FIG. 7 is a functional diagram of an inlet valve shown in a first operational state.

Referring to FIG. 7, a closed inlet valve assembly 1304 preferably includes a venting means 1308 operative to vent air from a fourth region 1312 of the closed inlet valve assembly 1304. A piston 1314 is positioned in a right-most piston position so that a third region 1316 of the inlet valve assembly 1304 is at a minimum size. An inlet valve member return spring 1320 urges an inlet valve member 1322 and a valve guide 1324 into a right-most position. The inlet valve member 1322 is seated on valve seat 1330. Therefore, communication between a fifth region 1334 and the fourth region 1312 of the inlet valve assembly 1304 is prevented. Typically, the inlet valve assembly 1304 assumes the closed state when an operator of a vehicle switches the tractor spring brake control valve 160, 684, 1216 from a spring brake release state into a spring brake exhaust state. This operation tends to trap pressurized air in the fourth region 1312 of the inlet valve assembly 1304 and in an inlet valve output conduit or passage 162, 696 (see FIGS. 1, 2A, and 2B).

This trapped air can affect the operation, sound and feel of the tractor spring brake control valve when the operator next attempts to release the spring brakes. For example, as the tractor spring brake control valve is moved from the exhaust state to the spring brake release state, trapped air would flow from the fourth region 1312 and associated passages into the spring brake line. As the air is delivered, an audible sound is emitted even if the primary and secondary pressure reservoirs are empty. In this case, the sound may confuse the operator into believing the spring brakes are released, when, in fact, they are still engaged. Additionally, the trapped air resists the operator's actuation of the tractor spring brake control valve. For example, the operator must compress the trapped air in order to move the tractor spring brake control valve into the spring brake release state. For the forgoing reasons, the inlet valve assembly 1304 preferably includes the venting means 1308.

For example, the venting means includes a vent seat 1340. The vent seat 1340 is operative to receive the inlet valve member 1322 when the inlet valve is in an open state. However, in the illustrated closed state, the inlet valve member 1322 is not seated on the vent seat 1340. When the piston 1314 is in the illustrated right-most position, the inlet valve seat 1330 serves to separate the inlet valve member 1322 from the vent seat 1340. The vent seat 1340 is at an inlet valve member end of an axial bore 1342 in a shaft portion 1344 of the piston 1314. The bore 1342 is operative to slidably receive the valve guide 1324. Additionally, a gap 1346 between the valve guide 1324 and a wall 1348 of the bore is operative as a first portion of a piston vent passage 1350 in the piston 1314. When the inlet valve assembly 1304 is in the illustrated closed state, the vent seat 1340 is positioned in the fourth region 1312. The piston vent passage 1350 is in communication with a frame vent passage 1352. The frame vent passage 1352 communicates with a vent region 1353, e.g., atmosphere.

When the inlet valve member 1322 is not seated on the vent seat, as shown in FIG. 7, the fourth region 1312 is in communication with the piston vent passage 1342 through the open vent seat 1340, the piston vent passage 1350, and in turn with the frame vent passage 1354 and the vent region 1353. When the inlet valve assembly 1304 is in the closed state, the venting means 1308 is in an open state. Therefore, air that would otherwise be trapped in the fourth region 1312 and associated passages when the inlet valve is closed is instead vented. Of course, the venting means 1308 must be sealed or closed when the inlet valve assembly 1304 is in an opened state.

Figure 8:
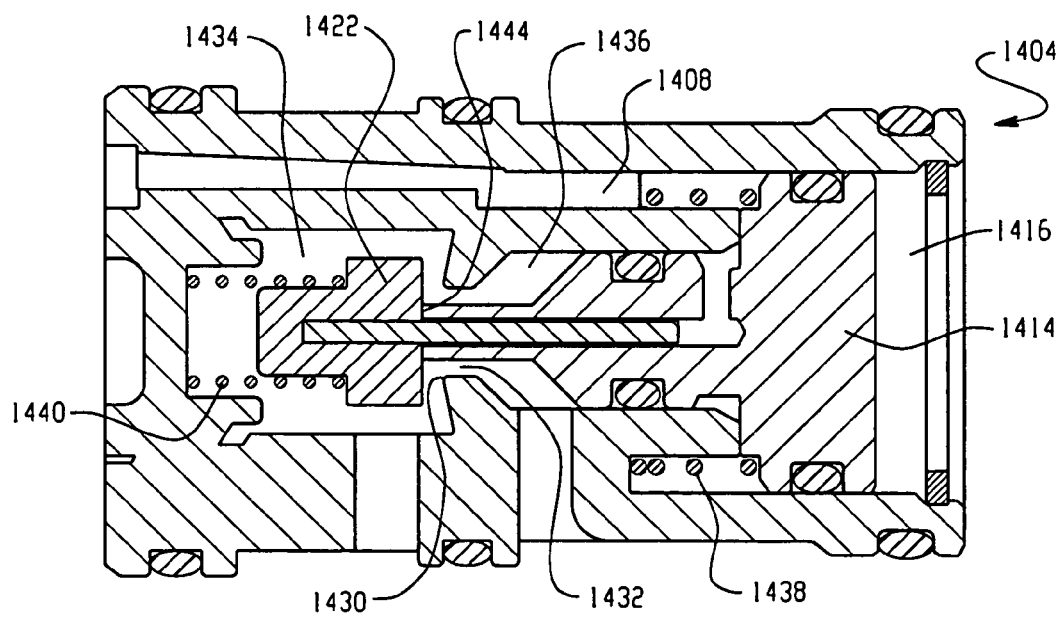
FIG. 8 is a functional diagram of the inlet valve of FIG. 7 in a second operational state.

Referring to FIG. 8, an open inlet valve assembly 1404 includes a sealed venting means 1408. A piston 1414 is positioned so that a third region 1416 of the inlet valve assembly 1404 is at a maximum size. Inlet valve member 1422 is unseated from inlet valve seat 1430 to form a communication path 1432 between fourth region 1436 and fifth region 1434. Typically, the inlet valve assembly 1404 is urged toward an open state when an operator of a vehicle actuates a service brake actuator 154, 683 in preparation to release parking spring brakes of a vehicle. This delivers pressurized air to the third region 1416 of the inlet valve assembly 1404 and drives the piston 1414 to the illustrated left-most position. As a result, the inlet valve member is urged against a vent seat 1444 portion of the piston 1414. Additionally, pressurized air in the fifth region 1434 also urges the inlet valve member against the vent seat 1444. Therefore, pressurized air is prevented from leaking out through the venting means 1408 while the inlet valve assembly 1404 is in the open state.

Figure 9:
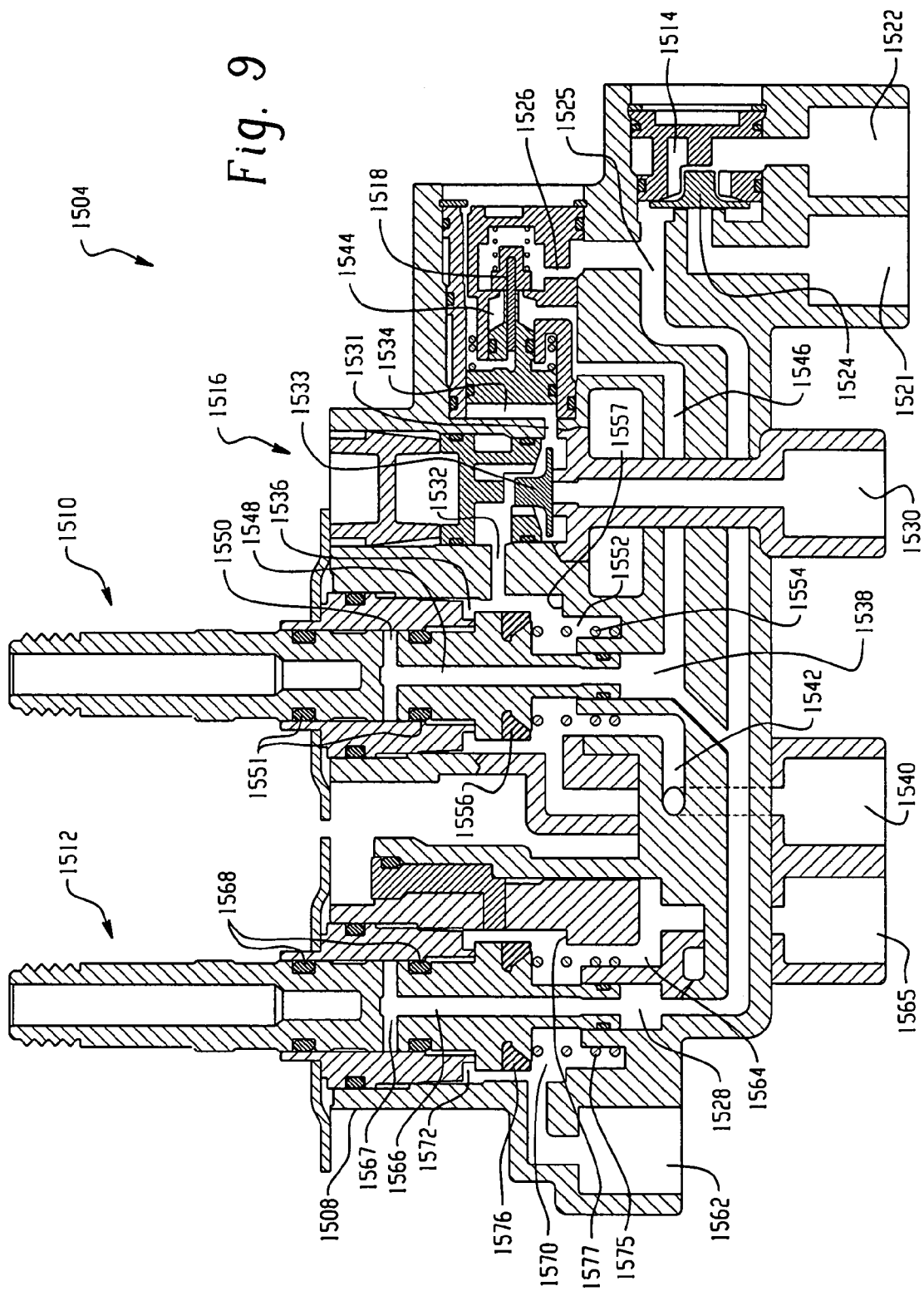
FIG. 9 is a functional diagram of a third valve assembly configured as a braking system control block operative to require a two-step brake release process.

Referring to FIG. 9, the inlet valve assembly 1304, 1404 of FIGS. 7 and 8 may be included in any of the valve assembly embodiments described herein. The third valve assembly 1504 includes in a single housing 1508, a tractor spring brake control valve 1510, a trailer supply valve 1512, a supply selector 1514, a control double check valve 1516, and an inlet valve 1518.

As described previously, the supply selector 1514 communicates with primary and secondary supply input ports 1521, 1522. Typically the primary and secondary supply ports are connected to primary and secondary pressurized air reservoirs (not shown). A selector check valve member 1524 of the supply selector 1514 moves to direct one of the primary and secondary supplies to a supply passage 1525. For example, the supply delivering pressurized air at the highest pressure is directed to the supply passage 1525.

The supply passage 1525 delivers pressurized air to an inlet or fifth region 1526 of the inlet valve 1518.

The control double check valve 1516 communicates with a control input port 1530, a control check valve output passage 1531 and a lockout passage 1532. As previously described, in a first mode of operation, a control check valve member 1533 within the control double check valve 1516 moves to direct one of pressurized air delivered to the control input port 1530 and pressurized air delivered to the lockout passage 1532 to the control check valve output passage 1531. For example, the port 1530 or passage 1532 carrying pressurized air at the highest pressure is directed to the control check valve output passage 1531. In a second mode of operation, pressurized air in the control check valve output passage 1531 is vented through the lockout passage 1532. The control check valve output passage 1531 merges into a third, or actuation region or piston, or control port 1534 of the inlet valve 1518. The lockout passage 1532 is in communication with a seventh region 1536 of the tractor spring brake control valve 1510.

The tractor and trailer spring brake control valves 1510, 1512, respectively, communicate with other devices through tractor and trailer valve input ports 1538, 1528, respectively, a spring brake delivery port 1540, and a first exhaust passage 1542. The tractor and trailer valve input ports 1538, 1528 receive pressurized air from a fourth inlet valve region 1544 through an inlet valve output passage 1546. Of course, the tractor and trailer valve input ports 1538, 1528 only receive pressurized air when the inlet valve 1518 is open. Of course, as previously described in reference to other figures, the inlet valve 1518 is only open when pressurized air directed to the third region or piston port 1534 by the control double check valve 1516 from the control port 1530 or the lockout passage 1532 are of sufficient pressure to hold the inlet valve 1518 open.

When the tractor spring brake control valve 1510 is pulled upward (actuated) (relative to the figure) into an exhaust state, as depicted in FIG. 9, any pressurized air delivered to the tractor valve input port 1538 will pressurize a tractor valve plunger passage 1548. However, the pressurized air from the tractor valve input port 1538 can travel no further, since distal ends 1550 of the plunger passage 1548 are isolated by plunger seals 1551 from any other region or passage. Additionally, when the tractor spring brake control valve 1510 is in the illustrated exhaust state, air in the lockout passage 1532 and the spring brake delivery port 1540 are placed in communication with, and flow out through, the first exhaust passage 1542 through an eighth region 1552 of the tractor spring brake control valve 1510.

When the tractor spring brake control valve 1510 is pushed downward (deactuated) (relative to the figure) into a delivery state, the distal ends 1550 of the plunger passage are placed in communication with the seventh region 1536 of the tractor spring brake control valve 1510. Therefore, pressurized air delivered to the tractor valve input port 1538 is placed in communication with the lockout passage 1532 and with the spring brake delivery port 1540. Pressurized air in the seventh region 1536 works on a tractor valve seal 1556. The pressurized air provides a force that overcomes a spring force of a tractor valve spring 1554. Therefore, when the tractor spring brake control valve 1510 is placed in the delivery state and the seventh region is filled with pressurized air, the pressurized air serves to hold or latch the tractor spring brake control valve 1510 in the delivery state. In the depressed position (not shown), or deliver state, the tractor valve seal 1556 is seated on a tractor valve seat 1557. In this position the tractor valve seal 1556 prevents communication between the first exhaust passage 1542 and the seventh 1536 or eighth 1552 tractor valve regions.

The trailer supply valve 1512 operates in a similar manner. The trailer supply valve 1512 communicates with other devices through the trailer valve input port 1528, a trailer delivery port 1562, a reset passage 1564 or sampling point and, through the reset passage with an exhaust port 1565. As mentioned above, the trailer valve input port 1528 receives pressurized air from the inlet valve output passage 1546.

When the trailer supply valve 1512 is pulled upward (actuated) (relative to the figure), into an exhaust state, as depicted in FIG. 9, any pressurized air delivered to the trailer valve input port 1528 pressurizes a trailer valve plunger passage 1566. However, the pressurized air from the trailer valve input port 1560 can travel no further since distal ends 1567 of the plunger passage 1566 are isolated by plunger seals 1568 from any other region or passage. Additionally, when the trailer supply 1512 is in the illustrated exhaust state, air in the trailer delivery port 1562 passes through a tenth region 1570 of the trailer supply valve 1512, through the trailer supply valve reset passage 1564 and is vented or exhausted through the exhaust port 1565.

When the trailer supply valve 1512 is pushed downward (relative to the figure) into a delivery state, the distal ends 1567 of the plunger passage 1566 are placed in communication with a ninth region 1572 of the trailer supply valve 1512. Therefore, pressurized air delivered to the trailer valve input port 1528 is placed in communication with the trailer delivery port 1562. Pressurized air in the ninth region 1572 works on trailer valve seal 1576, providing a force that overcomes a spring force of a trailer valve spring 1575. Therefore the trailer supply valve 1512 is held or latched in a depressed or delivery state. In the delivery state (not shown) a trailer valve seal 1576 is seated on a trailer valve seat 1577. In this position the trailer valve seal 1576 prevents communication between the trailer supply valve reset passage 1564 and the ninth 1572 or tenth 1570 tractor valve regions.

Of course, pressurized air delivered to the trailer delivery port 1562 flows out of the valve assembly. Typically the trailer system (not shown) is connected to the trailer delivery port 1562. Therefore, when the trailer valve plunger is in the depressed position, pressurized air flows from the supply selector 1514, through the inlet valve 1518, the inlet valve output passage 1546, and the trailer plunger passage 1566 into the ninth region 1572, out the trailer delivery port 1562 and into the trailer system.

Of course, at low system pressures, the force working on the trailer valve seal 1576 falls below a threshold and the trailer valve spring forces the trailer supply valve 1512 into the exhaust state, thereby applying the brakes of any attached trailer.

In addition to the low pressure auto exhaust feature just described, the trailer supply valve 1512 can also be automatically driven into the exhaust state by exhaust air from the tractor spring brake control valve 1510. When the tractor spring brake control valve 1510 is switched or moved into the exhaust state, pressurized air from a spring brake line (not shown) attached to the spring brake delivery port 1540 is directed to the first exhaust passage 1542 through the tractor spring brake control valve 1510. As the air flows toward the exhaust port 1565, reset port 1564 is also pressurized. If the trailer supply valve 1512 is in the delivery state when tractor spring brake control valve 1510 exhaust air pressurizes the reset port, then a force generated by the pressure in the reset port is added to a force delivered by the trailer valve spring 1575. The combined forces overcome the force generated by pressurized air in the tenth region 1570 applied to the trailer valve seal 1576. Therefore, the trailer supply valve 1512 is automatically switched into the exhaust state.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A valve assembly for an air pressure system, comprising:

an inlet valve including an inlet port, an outlet port and a control port, the inlet port communicating with the outlet port when the control port is above a threshold pressure;

a first control valve including an inlet port, an outlet port, an exhaust port, and a control member, the first control valve inlet port being in communication with the inlet valve outlet port, the first control valve outlet port communicating with one of the first control valve inlet port and the first control valve exhaust port as a function of a position of the first control valve control member; and a second control valve including an inlet port, an outlet port, an exhaust port, and a control member, the second control valve inlet port being in communication with the inlet valve outlet port, the second control valve outlet port communicating with one of the second control valve inlet port and the second control valve exhaust port as a function of a position of the second control valve control member.

2. The valve assembly as set forth in claim 1, further including:
a double check valve including an inlet port, a locking pressure port, and an outlet port communicating with the inlet valve control port, one of the double check valve inlet port and the locking pressure port communicating with the double check valve outlet port as a function of relative air pressures at the double check valve inlet and locking ports.

3. The valve assembly as set forth in claim 2, further comprising:
a proportional valve for delivering selectively pressurized air to service brakes and the double check valve inlet port, the inlet valve inlet port communicating with the inlet valve outlet port if a pressure at one of the double check valve inlet port and the locking port is above the threshold pressure.

4. The valve assembly as set forth in claim 3, wherein:
the first control valve outlet port communicates with a tractor spring brake; and
the second control valve outlet port communicates with a trailer spring brake.

5. The valve assembly as set forth in claim 4, wherein:
the tractor spring brake is applied when a pressure at the first control valve outlet port is less than the threshold pressure; and
the trailer spring brake is applied when a pressure at the second control valve outlet port is less than the threshold pressure.

6. The valve assembly as set forth in claim 4, wherein:
the tractor spring brake is released if the pressurized air delivered to the service brakes and the control port is above the threshold pressure, for causing pressurized air at the inlet valve inlet port to be communicated to the first control valve inlet port via the inlet valve outlet port, and if the first control valve control member is positioned for communicating the pressurized air from the first control valve inlet port to the first control valve outlet port and to the tractor spring brakes; and
the trailer spring brake is released if the pressurized air delivered to the service brakes and the control port is above the threshold pressure, for causing the pressurized air at the inlet valve inlet port to be communicated to the second control valve inlet port via the inlet valve outlet port, and if the second control valve control member is positioned for communicating the pressurized air from the second control valve inlet port to the second control valve outlet port and to the trailer spring brakes.

7. The valve assembly as set forth in claim 1, wherein the first control valve outlet port communicates with the locking pressure port.

8. The valve assembly as set forth in claim 1 further comprising:
an exhaust conduit communicating with the first control valve exhaust port and the second control valve exhaust port.

9. A braking system control for a vehicle including a service braking system and a parking braking system, the braking system control preventing the parking braking system from releasing the wheels of the vehicle unless the service braking system is engaged, the braking system control comprising:

a system pressure valve, which opens when a sensed control pressure is above a first threshold and that closes when the sensed control pressure is below a second threshold, including a system pressure valve inlet and a system pressure valve outlet, the system pressure valve directing pressurized air delivered to the system pressure valve inlet to the service braking system through the system pressure valve outlet when the system pressure valve is open and preventing pressurized air from reaching the parking braking system when the system pressure valve is closed;
a first control valve including an inlet port, an outlet port, an exhaust port, and a control member, the first control valve inlet port being in communication with the system pressure valve outlet, the first control valve outlet port communicating with one of the first control valve inlet port and the first control valve exhaust port as a function of a position of the first control valve control member; and
a second control valve including an inlet port, an outlet port, an exhaust port, and a control member, the second control valve inlet port being in communication with the system pressure valve outlet, the second control valve outlet port communicating with one of the second control valve inlet port and the second control valve exhaust port as a function of a position of the second control valve control member.

10. The braking system as set forth in claim 9, further including:
a latching mechanism communicating a higher one of a service braking system control pressure and a parking braking system releasing pressure as the sensed control pressure to the system pressure valve.

11. The braking system as set forth in claim 9, wherein:
the sensed control pressure is a higher one of a service braking system control pressure and a parking braking system releasing pressure; and
if the sensed control pressure is below the second threshold, no pressurized air is transmitted from the system pressure valve to either the first or second control valves.

12. The braking system as set forth in claim 9, wherein:
the sensed control pressure is a higher one of a service braking system control pressure and a parking braking system releasing pressure; and
if the sensed control pressure is above the first threshold, pressurized air is transmitted from the system pressure valve to both the first and second control valves for enabling release of the parking braking system if the first and second control valve control members are positioned for communicating the pressurized air from the first and second control valves to the parking braking system.

13. The braking system as set forth in claim 12, wherein:
the first control valve communicates with a tractor parking brake; and
the second control valve communicates with a trailer parking brake.

14. The braking system as set forth in claim 13, wherein:
both the tractor parking brake and the trailer parking brake are applied if the first and second control valve control members are positioned for exhausting pressurized air from the tractor and trailer parking brakes.

15. A valve assembly for an air pressure system of a vehicle including a service brake, a first spring brake, and a second spring brake, comprising:

a first control valve including an inlet port, an outlet port fluidly communicating with the first spring brake, an exhaust port, and a control member, the first control valve outlet port communicating with one of the first control valve inlet port and the first control valve exhaust port as a function of a position of the first control valve control member;

a second control valve including an inlet port, an outlet port fluidly communicating with the second spring brake, an exhaust port, and a control member, the second control valve inlet port being in fluid communication with the first control valve inlet port, the second control valve outlet port communicating with one of the second control valve inlet port and the second control valve exhaust port as a function of a position of the second control valve control member; and means for communicating pressurized air to the first control valve inlet port and the second control valve inlet port as a function of a pressure of the service brake and a pressure of the first spring brake.

16. The valve assembly as set forth in claim 15, wherein the means for communicating includes:

an inlet valve including an inlet port, an outlet port and a control port, the inlet valve outlet port fluidly communicating with the first control valve inlet port and the second control valve inlet port, the inlet valve inlet port communicating with the inlet valve outlet port when the control port is above a threshold pressure.

17. The valve assembly as set forth in claim 16, further including:

means for delivering a higher one of the pressure of the service brake and the pressure of the first spring brake to the inlet valve control port.

18. The valve assembly as set forth in claim 17, wherein the means for delivering is a double check valve.

19. The valve assembly as set forth in claim 17, wherein:

the pressure of the service brake is above the threshold pressure when the service brake is applied;

the pressure of the first spring brake is below the threshold pressure when the first spring brake is applied; and the means for communicating communicates the pressurized air to the first and second control valve inlet ports for enabling release of the first and second spring brakes, respectively, when the pressure of at least one of the service brake and the first spring brake is above the threshold pressure.

20. The valve assembly as set forth in claim 15, wherein pressurized air is communicated to the first and second control valve inlet ports, for enabling release of the first and second spring brakes, respectively, when at least one of the service brake is applied above a threshold pressure and the first spring brake is released.

* * * * *